Aug. 7, 1956          A. M. MOEN                2,757,687
              SINGLE VALVE MIXING FAUCET
Filed March 28, 1955                        4 Sheets-Sheet 1
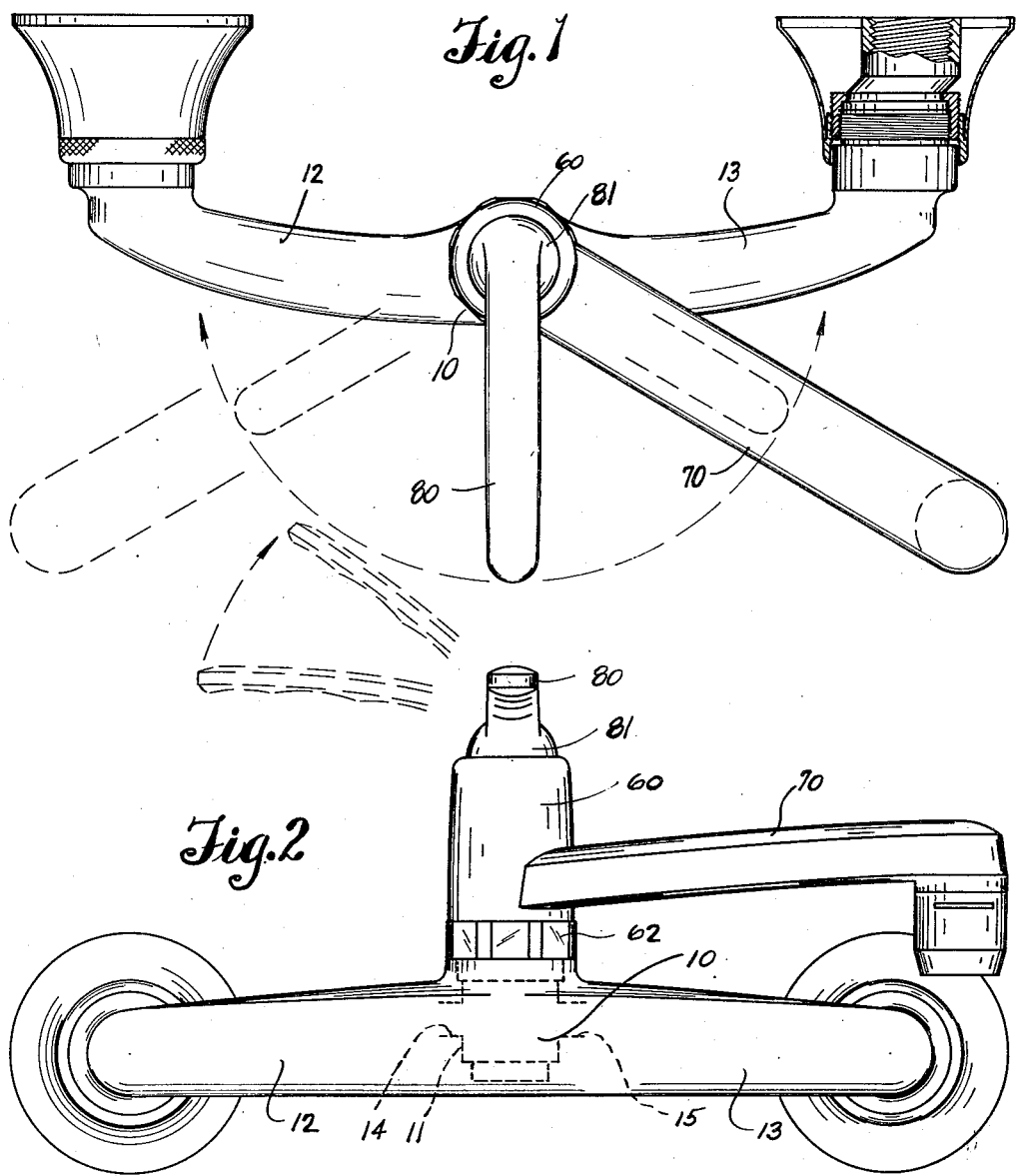
Inventor
ALFRED M. MOEN
By
Cook & Robinson
Attorney Aug. 7, 1956 — A. M. MOEN — 2,757,687
SINGLE VALVE MIXING FAUCET
Filed March 28, 1955 — 4 Sheets-Sheet 2
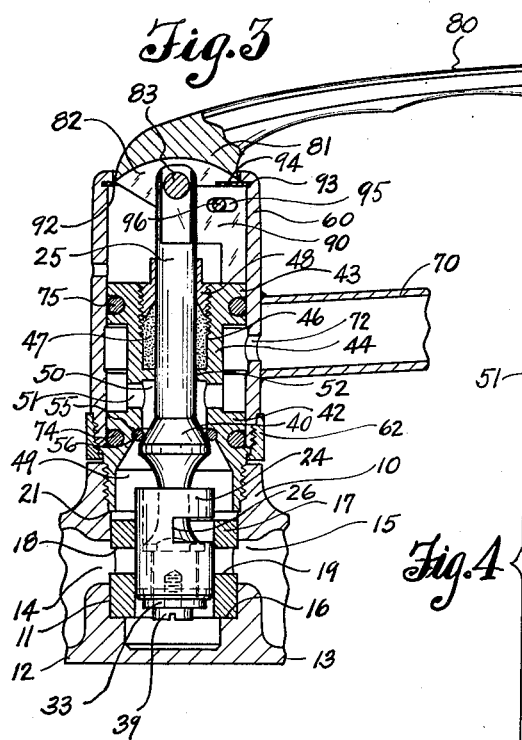
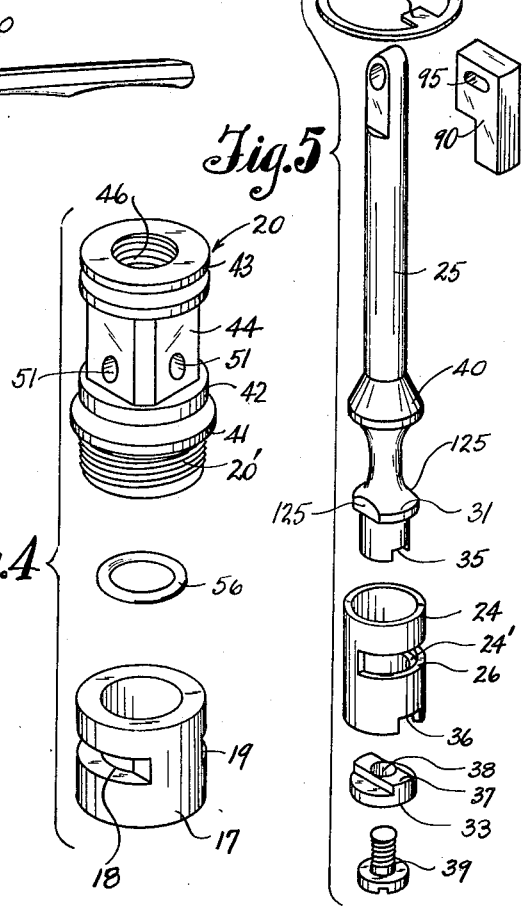
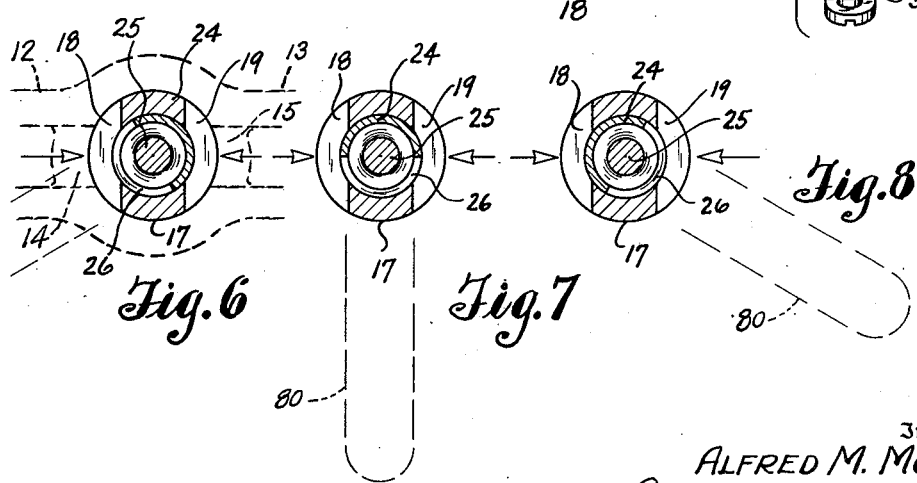
Inventor
ALFRED M. MOEN
By Cook & Robinson
Attorney Aug. 7, 1956    A. M. MOEN    2,757,687
SINGLE VALVE MIXING FAUCET
Filed March 28, 1955    4 Sheets-Sheet 3
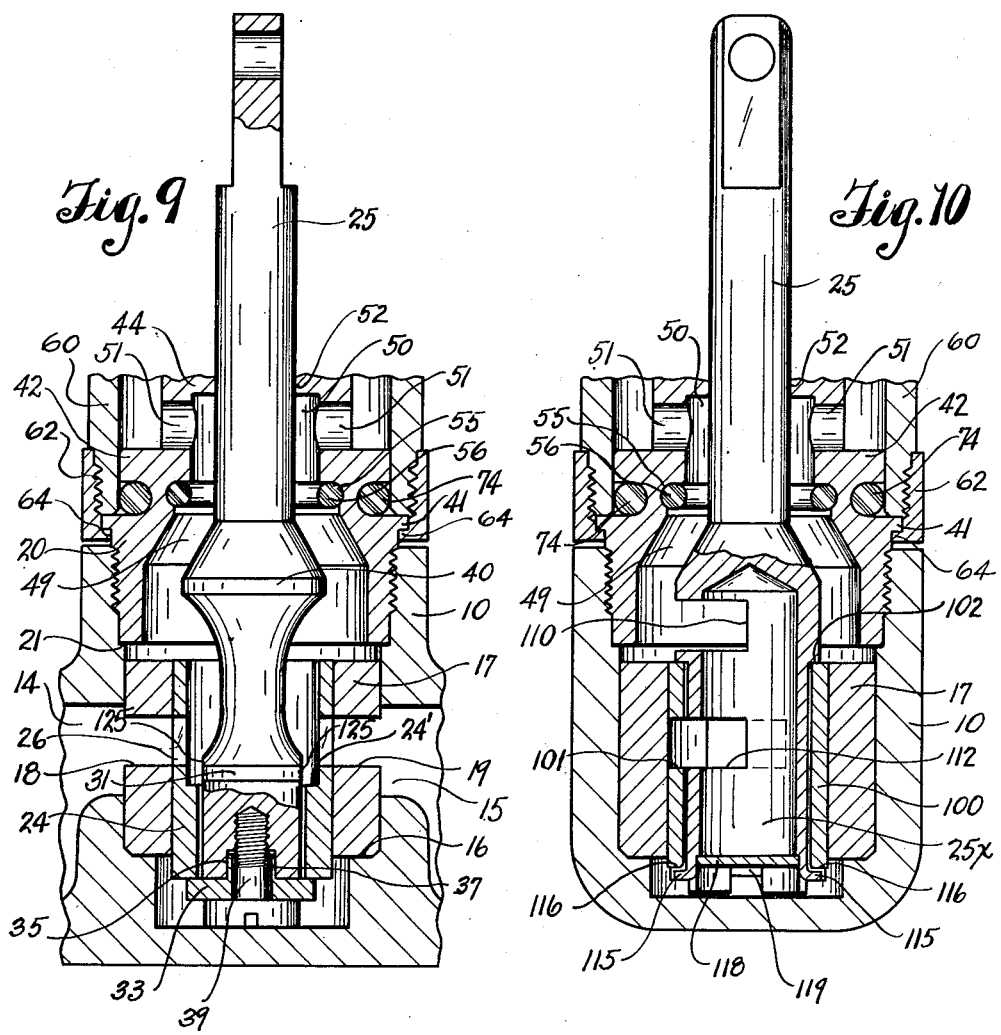
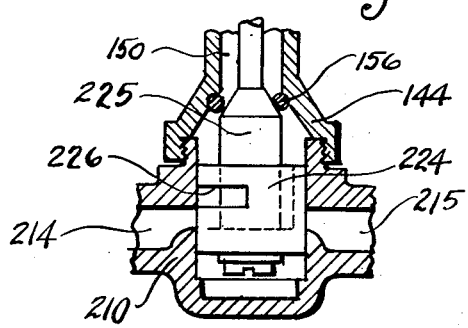
Inventor
ALFRED M. MOEN
By Cook & Robinson
Attorney Aug. 7, 1956 A. M. MOEN 2,757,687
SINGLE VALVE MIXING FAUCET
Filed March 28, 1955 4 Sheets-Sheet 4
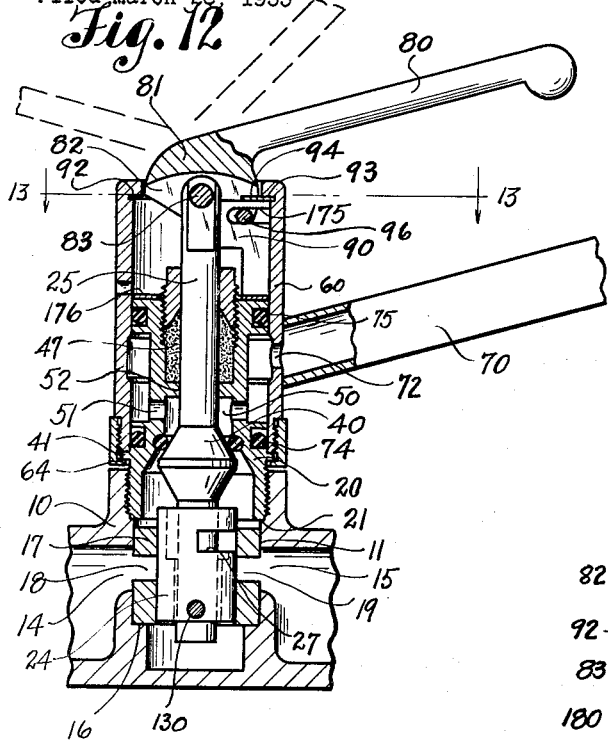
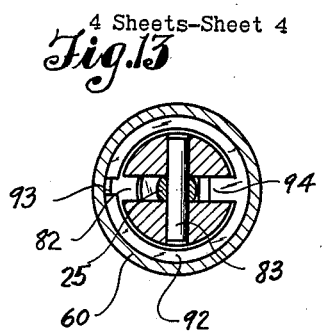
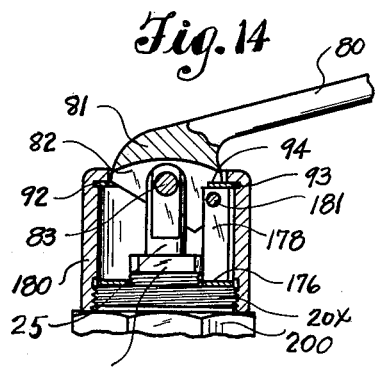
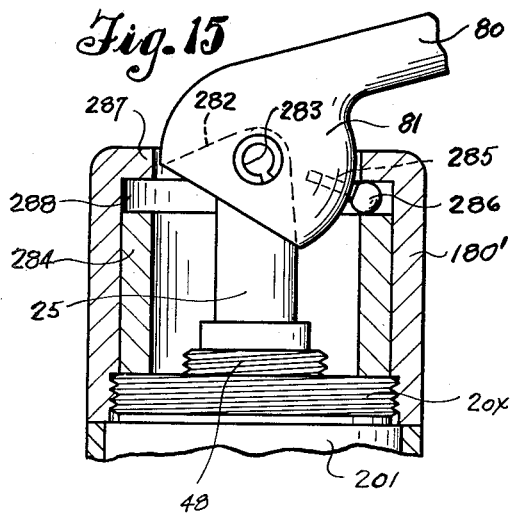
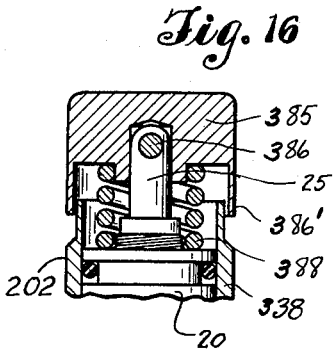
INVENTOR.
ALFRED M. MOEN
BY
Cook & Robinson
ATTORNEYS United States Patent Office 2,757,687
Patented Aug. 7, 1956

2,757,687

SINGLE VALVE MIXING FAUCET

Alfred M. Moen, Seattle, Wash.

Application March 28, 1955, Serial No. 496,965

8 Claims. (Cl. 137—625.41)

This invention relates to faucets, and it has reference more particularly to improvements in what are known as "mixing faucets," and which are designed for domestic use in connection with sinks, laundry trays, bath tubs, washing machines, and the like, where hot and cold running water is used, and is controlled in mixture and volume by a single valve member.

More specifically stated, the present invention pertains to improvements in mixing faucets of the character of those described and illustrated in my U. S. Patents Nos. 2,373,702 and 2,609,206; it being the principal object of the present invention to provide a faucet embodying the general principles of design of the patented device to the extent that a single valve controls the proportionate amounts of hot and cold water and volume delivered, but having improvements in details of construction of valve parts, and valve control elements that result in the lessening of wear on moving parts, that eliminates tendency of the valve to bind under unequal application of water pressure at opposite sides; that insures against leakage past the valve member, and provides an easier manipulation of valve parts.

This application is a continuation-in-part of my allowed co-pending application Serial No. 222,545, filed April 24, 1951, which was forfeited.

It has also been a specific object of this invention, to provide improvements in the valve structure that reduces manufacturing cost and facilitates assembly.

Another object of the invention has been to provide a more practical and less expensive means for and method of attaching the valve element to the valve stem.

Yet another object has been to improve the valve body structure from which the swing spout is extended, to simplify and reduce cost of construction.

Still another object of the invention is to provide a handle or control lever mounting that reduces wear on parts and makes possible a quick and easy assembly of parts.

In accomplishing these and other objects of the invention, I have provided the improved details of construction, the preferred forms of which are illustrated in the accompanying drawings, wherein:

Fig. 1 is a top view of a "swing spout" faucet embodying the improvements of the present invention therein.

Fig. 2 is a front view of the same.

Fig. 3 is a central, vertical cross-section of the valve and valve housing, showing the hot and cold water supply connections.

Fig. 4 shows in perspective view, the valve stem mounting member and valve guide sleeve in spaced relationship.

Fig. 5 is a view showing the valve, valve stem and associated parts in separated relationship for better understanding.

Figs. 6, 7 and 8 are cross-sectional views of the valve and valve containing sleeve housing, showing the valve in its different positions of adjustment for delivery of all hot water; a mixture of hot and cold water, and of all cold water, respectively.

Fig. 9 is an enlarged cross-sectional view of the valve structure with the valve fully open.

Fig. 10 is a similar cross-sectional view in which a valve structure of a modified or alternative form is shown.

Fig. 11 is a cross-sectional detail of a valve of another alternative construction.

Fig. 12 is a cross-sectional view of a valve having an alternative form of handle fulcruming means and an alternative means for operatively connecting the valve member with the valve stem.

Fig. 13 is a cross-section on line 13—13 in Fig. 12.

Fig. 14 is a detail showing still another fulcruming means for the handle.

Fig. 15 is still another form of fulcruming means for the handle.

Fig. 16 is a sectional detail of another form of valve actuating means.

Referring more in detail to the drawings and particularly to the showing of the faucet of Figs. 2 and 3, the valve housing is designated in its entirety by reference numeral 10. Formed in this housing 10 and opening to the upper face end thereof is a cylindrical chamber 11. Connected with the housing at its opposite sides, are water supply pipes 12 and 13 which, respectively, are designed to be connected at their ends by any suitable means, to sources of supply of hot and cold water adapted to be delivered under pressure to the faucet. As best shown in Figs. 3 and 9, the channels of the supply pipes 12 and 13 open into the valve chamber 11 through passages 14 and 15 that are located in diametrically opposite relationship, as indicated in Figs. 3 and 6.

The closed lower end portion of the cylindrical chamber 11 is reduced in diameter, thus to provide an upwardly facing annular shoulder 16. Press fitted in the chamber and seated at its lower end against this shoulder is a carefully machined cylindrical sleeve 17 which extends as seen in Fig. 3, above the level of the passages 14 and 15. This sleeve is formed in the outer surfaces of its opposite side walls, with horizontally directed channels 18 and 19, well shown in Figs. 4 to 9. These channels are in direct communication with the water supply passages 14 and 15, respectively, and provide hot and cold water inlets of exact dimensions into the sleeve 17. These inlets are directly opposite each other and are equal in their arcuate extent, that is, each extends through an arc of about 80° in a direction circumferentially of the sleeve.

The upper end of the cylindrical chamber 11 has an axially bored, closure and valve stem mounting plug threaded thereinto; this plug is designated in its entirety by numeral 20 and is best shown in Fig. 4. It will presently be described in detail.

The lower end surface of the plug 20 is machined and is seated against a machined annular, upwardly facing shoulder 21 in the chamber 11, to insure a desired exactness in extent of threading of the member into the housing, and also provides a water seal.

Fitted rotatably and slidably in the sleeve 17 is the mixing and volume control valve member 24 which is of sleeve piston type and is disposed about and fixed to the lower end portion of a valve stem 25.

A feature of the present invention resides in the means for and method of securing the valve member 24 to the stem 25. This will now be described with reference directed particularly to Figs. 5 and 9. First, it is to be explained that the valve sleeve 24 is tubular, with a central bore of two diameters, thus providing an annular, upwardly facing shoulder 24' therein located below the medial point between upper and lower ends as best seen in Fig. 9. Above this shoulder, the cylindrical wall of the valve is formed with a circumferentially directed opening 26, that extends through an arc of 180° as noted in Fig. 7. By endwise movement of the valve sleeve, this opening 26 can be moved from full open position in registration with the passages 18 and 19 of sleeve 17, as seen in Fig. 9, upwardly to a closed position completely above these passages. Also, it may be rotatably adjusted while in any open position to change the effective area of the hot and cold water inlet openings as will be understood by reference to Figs. 6, 7 and 8.

The valve stem 25 extends coaxially of the member 20, passing slidably and rotatably through a packed gland 47 in its upper end portion. Near its lower end, the stem is formed at opposite sides with projecting flanges 31 adapted to be contained within the portion of larger diameter of the valve and to seat firmly against the upwardly facing shoulder 24' therein. The lower end portion of the stem passes downwardly through the reduced lower end diameter of the valve with slight clearance as seen in Fig. 9. Secured to the lower end of the stem is a valve retaining button 33 which is designed to function as a means for locking and holding the valve 24 against any possible turning relative to the stem. This valve securing effect is accomplished by reason of the following: Formed in the lower end surface of the stem, diametrically thereacross, is a channel 35. Likewise, formed in the lower end of the valve sleeve 24 at diametrically opposite points, are recesses, as at 36 in Fig. 5. The recesses are designed to be aligned or registered with the opposite ends of the channel 35 when the parts are assembled as in Fig. 9. Formed diametrically across the top surface of the button 33, as best seen in Fig. 5, is a rib 37, and centrally of the button is a hole 38 for the reception of a securing bolt 39.

In assembling these parts, the stem is first extended down into the valve and the flange 31 thereon seated against the upwardly facing shoulder 24' in the valve. Then the valve is turned to register the recesses 36 therein with the ends of the channel across the lower end of the stem. Then the button 33 is applied by seating the cross rib 37 thereof in the channel 35 and recesses 36—36. Then the securing bolt 39 is applied upwardly through the hole in the button and is threaded into the end of the stem as has been clearly shown in Fig. 9. The button thus is drawn tightly against the stem, and holds the valve sleeve secured to the stem against any relative rotation but with some freedom of movement thereon for self alignment purposes as applied to sleeve 17.

That portion of the stem 25 which is immediately above the flange 31, is constricted, or reduced in diameter to give ample clearance between it and the walls of valve sleeve for the flow of water through the valve when it is in any open position of adjustment.

Formed about the valve stem above the upper end of the valve sleeve 24 is an annular enlargement in the form of an upwardly facing conical head or valve member 40. This is contained within the chambered lower end portion of the valve stem mounting member 20.

The stem mounting plug 20, as best shown in Figs. 3 and 4 is threaded at its lower end, as at 20' and has an encircling flange 41 adjacent the lower threaded end portion. Immediately above this flange the body has a circular, diametrically reduced portion, as designated at 42 in Fig. 4. At the upper end of the member 20 is a circular portion 43, of the same diameter as part 42. Between the parts 42 and 43 the body is somewhat reduced in diameter and is then cut away to the squared body form shown at 44 in Fig. 4.

The plug 20 is also formed with a coaxially bored socket 46 in its upper end portion adapted to contain a packing material as at 47, and this socket is threaded for the reception of a packing gland nut 48. The lower end portion of the member 20 is bored out to provide the concentric chamber 49 which opens directly downward into the chamber 11. At its upper end, the chamber 49 is conically tapered to a central bore 50 from which ports 51 lead radially to the sides of the squared body portion of the member 20.

The valve stem extends coaxially of the plug 20, and through a hole 52 at the bottom of the socket 46 of substantially the same diameter as the stem.

Seated in a groove 55 formed in the conical upper end surface of chamber 49, adjacent the lower end of bore 50 is a gasket 56 of O-ring form, against which the conical surface of the valve head 40 on the stem is adapted to be seated to check outflow of water from the chamber 49.

Enclosing the plug 20 is a tubular housing 60 which forms the mounting for the swing spout of the faucet. This fits snugly about the parts 42 and 43 of the member 20, but is easily rotatable thereon. A securing collar 62 is threaded onto the lower end of housing 60, and this has an inturned flange 64 at its lower end engaged against the underside of the flange 41 on member 20 to hold the part 60 in place, that is, against upward lifting on part 20.

Welded to the housing 60 is the water discharge spout 70, and opening through the sidewall of the housing into the spout is a port 72. Water that passes the open valve into the socket 50, will be discharged through ports 51 into the housing 60 between the parts 42 and 43 of the member 20, and then through port 72 into the spout.

To seal the housing 60 against water leakage, the parts 42 and 43 are circumferentially channeled and sealing gaskets 74 and 75 of O-ring type are set in the channels to contact with the walls of the housing.

For the rotation and endwise adjustment of the valve stem 25, for valve adjustment, I provide a hand lever 80. This is provided with a circular head 81 at its inner end fitted rotatably within the upper open end of the housing 60. The under face of the head 81 has a diametric cross channel 82 and the channel receives the upper end portion of the valve stem therein. A pivot pin 83 is passed through the stem and into the head, as in Fig. 3, to operatively connect the stem and lever. By swinging the lever about the axial line of the stem, as indicated in Fig. 1, the valve will be rotated accordingly thus to obtain any desired water mixture, or all cold or all hot water.

In order to adjust the stem 25 longitudinally to regulate volume or to close the valve, I have provided a fulcrum block 90, best shown in Fig. 3, that is contained in the upper end of the housing 60 between the stem and housing wall. This block rests at its lower end on the upper end surface of member 20 and is slidable thereon. It has its upper end fitted within the cross channel 82 in the underside of the lever head and is held against upward lifting by means of a split ring-like washer 92 that is snapped into an annular channel 93 cut in the inside surface of the housing 60 adjacent its upper end. This ring 92 has an inwardly projecting tongue 94 that engages flatly against the top end of the block and extends into the cross-channel of the head of the lever. Thus when the hand lever is turned from side to side, its head 81 rotates accordingly and the block 90 moves with it, as also does the retaining ring 92.

Formed horizontally in the upper end portion of the block in the direction radially of the stem, is a horizontal slot 95 and extended through this slot is a fulcrum or pivot pin 96 secured in the head 82.

It will thus be understood, by reference to Fig. 3, that any upward or downward movement of the outer end of the hand lever 80 will cause the head to pivot on the pin 96 and thus cause the lifting or lowering of the valve stem through its pivot pin connection 83 with the head. The parts are so designed that the valve sleeve 24 can be moved endwise between the raised and completely closed position in which it is shown in Fig. 3, to the lowered and fully open position of Fig. 9, by the up and down action of the outer end of the hand lever. Also, it is apparent that when in any position, the valve can be rotated to cause the valve passage 26 to be selectively registered with one or the other of the water inlets, as shown in Figs. 6 and 8, or with both as seen in Fig. 7. By such rotative adjustment of the valve 24, the proportionate amounts of hot and cold water can be varied to any desired extent from all one to all of the other.

The particular advantage in the present cylindrical valve construction with side opening resides in the fact that unequal water pressures against opposite sidewalls of the valve, as when in any open position, will not cause a bind on the valve or cause uneven wear to result therefrom.

The advantage in the present means of connecting the stem and valve resides in the ease of assembly; the security of connection and the lowered cost of manufacturing and assembly as compared with that of devices as previously made.

In Fig. 10, I have illustrated in alternative, or a modified form of construction, like that of Fig. 9, in most respects but differing in details of valve and stem structure. It includes the valve guide sleeve 17 as in Fig. 9. In this design there is a cylindrical valve sleeve 100 formed with a circumferential inlet 101 for selective registration with the hot and cold water inlets of the sleeve 17. The lower end of the valve stem 25 is not reduced in diameter immediately below the conical head 40 but is continued at the full diameter of the head to the valve, and is there just slightly reduced in diameter to form a shoulder 102 and then is continued coaxially through the valve sleeve 100 in a loose fit. The lower end of the stem 25 is formed with a central bore 25x that extends upwardly into the conical head portion 40a. A slot 110 is cut through the hollow portion of the stem above the valve, to cause the upper end of bore 25x to open into the lower end chamber 49 of the stem mounting member 20. The tubular lower end portion of the stem also is formed with a sidewall opening 112 registered with the valve opening 101. The stem and valve are locked rigidly together by the seating of the upper end of the tubular valve 100 against the stem shoulder 102 and by means of ears 115 outturned from the lower end of the stem to engage in notches 116 in the lower end edge of the valve sleeve. The lower end of the bore 25x of the stem is closed by a disk or plate 118 that is fitted therein and secured by ears 119 that are inturned from opposite sides of the lower end of the stem.

In this device, water that enters the valve sleeve 100 flows directly into the stem bore 25x and out from the upper end thereof through side opening 110. The control of flow of water is otherwise accomplished in the same manner as in the device of Fig. 9 by the up and down movement and rotative adjustment of the valve 100 as accomplished by the stem.

It is shown in Figs. 5 and 9 that segments are cut away from opposite side portions of the annular flange 31 formed about the valve stem, as seen at 125 so as to prevent the absolute sealing off of the lower end of chamber 11.

It is also to be explained that while I have stated that the sleeve 17 is of hard metal and is press fitted into the chamber 11, I anticipate making the parts 17 and also the valve elements of glass or plastic, and further have anticipated the gluing of the parts 17 in place in lieu of a pressed fit.

In the construction shown in Fig. 11, the valve housing 210 is formed with a cylindrical chamber 111 in which a valve sleeve 224 is fitted for rotary and longitudinal adjustment. The housing has inlets 214 and 215 opening into the sides of the chamber and the sleeve has a sidewall passage 226 adapted to be moved into and from registration with the chamber inlets to regulate flow. In this construction the valve sleeve is fitted to the chamber wall and the use of a bushing, corresponding to the bushing 17 of Fig. 3, is eliminated.

A stem mounting housing 144 is threaded onto housing 210 and a valve stem 225 mounted therein and connected to the valve sleeve for its actuation as in the construction previously described. The valve stem is formed with an upwardly facing shoulder 142 designed to close against a gasket 156 fitted in the chamber outlet 150. Clearance is provided between stem 225 and valve sleeve 224 and also between the stem and chamber wall for outflow of water through the housing 144 and passage 150.

Referring now to the alternative form of certain parts as shown in Figs. 12 and 13: In these views, parts that have not been changed from their showing in Figs. 3 and 9 have been given the same reference numerals and will not be further described. It is to be noted in this view that the fulcrum block 90 is formed with a horizontal slot 175 that opens through the vertical outer edge of the block instead of being a closed slot. This provides that the pivot pin 96 can be applied and permanently fixed in the head 81 of the handle lever and that the block can be assembled therewith by hooking the pin into the slot of the block. The mode of use is as previously described. It is noted also that the block 90 rests at its lower end on a flat washer 176 placed upon the flat upper end surface of the plug 20.

It is also to be noted in Fig. 12 that in lieu of the button 33 and screw 39, as shown in Fig. 5, for locking the valve sleeve 24 against turning on the lower end of the stem 25, I here apply a pin 130 diametrically through the lower end of the valve and stem. The valve in this instance also has clearance about the lower part of the stem for the self aligning of the valve in the sleeve 17.

As another alternative form of fulcrum member I provide a vertical post 178 as shown in Fig. 14. In this view, it is shown that the plug 200 has a reduced, externally threaded upper end portion 20x and that the upper end of stem 25 extends from plug 200 and is enclosed by a cylindrical housing 180. This housing is threaded onto the upper end portion 20x of the plug. The hand lever 80 has its head 81 pivoted on the stem 25 by pin 83 in the same way and the fulcrum post 178 rests at its lower end against a flat washer 176 applied against the top end surface of the plug, and its upper end extends into the slot 82 of the head end of the lever, and is pivotally attached thereto by a pivot pin 181 extended through the head and post. The mode of operation for valve adjustment is as previously described. In this construction no spout is employed and the discharge, not shown, is integral with the valve housing, not shown, similar to that illustrated in Fig. 8 of my U. S. Patent No. 2,609,206, as would be suitable for a shower valve installation.

Yet another alternative form of construction is shown in Fig. 15. In this, the head portion 81 of the lever 80 is socketed as at 282, to receive the upper end portion of the stem 25 therein and the stem is pivotally attached to the head by a pivot pin 283. A housing 180' is threaded onto the upper end portion 20x of plug 201, as in Fig. 14, and fitted in this housing is a sleeve 284. A stud 285 is mounted in the head below the lever 80 and this is formed at its end with a spherical head 286 that is contained in an encircling channel 288 between the top end surface of the sleeve 284 and inturned flange 287 about the upper end of the housing 180'. The stud head acts as a fulcrum support on which the handle lever can pivot to lift and lower the valve stem. The handle lever can also swing radially to rotatably adjust the valve and in this adjustment, the head 286 travels in the channel 288. The sleeve 202 mounts a swing spout, not shown, similar to the construction illustrated in my U. S. Patent No. 2,609,206.

The alternative device, as shown in Fig. 16 shows a bonnet 385 attached to the upper end of stem 25 by a pin 386. The bonnet or button 385 has a skirt portion 386', telescopically fitted about the upper end portion of a housing 338 that is fitted about plug 20. A coiled spring 388 is disposed under compression between the bonnet and plug to yieldingly retain the valve in a closed position. Through the mediacy of the button or bonnet, the stem can be depressed to open the valve, and also the valve can be rotatably adjusted by turning the button.

In the preferred construction shown in Figs. 12 and 13 and also in the modifications or alternative forms shown by Figs. 14 and 15, the novelty on which invention is based resides in the provision of a valve stem actuating handle which is rotatable and equipped with a fulcrum member which moves with the handle and stem as they are rotated; the fulcrum member being contained within a housing which also surrounds the upper end portion of the stem and that end portion of the handle that is mounted thereby, thus giving a clean cut stream lined effect.

Having thus described my invention, what I claim as new therein and desire to secure by Letters Patent is:

1. In a mixing faucet comprising a housing enclosing a mixing chamber with water inlets and a valve means in the chamber for controlling inflow of water through the inlets, a plug mounted in the chamber and extended from the housing and said plug being provided with a water passage from the chamber, a stem mounted in the plug for longitudinal and rotatable adjustment therein and operatively interconnected at its inner end to the valve means for its actuation and the outer end of the stem extending beyond the plug, a tubular housing fitted about the plug and extended beyond its outer end, a fulcrum block contained in the outer end portion of the said tubular housing, in supporting engagement with the plug, a valve adjusting lever having a head portion rotatably fitted in the outer end portion of the tubular housing and said head having a diametric channel formed therein adapted to receive the upper end of said stem and pivot pins connecting the upper end of the stem and the block to said head for the rotatable and longitudinal adjustment of the stem through the mediacy of the lever.

2. A mixing valve comprising a valve housing formed with a valve chamber open at one end and having water inlets opening into the chamber, a valve means including at least one movable element in the chamber for controlling inflow of water through the inlets, an independent stem mounting plug positioned at the open end of the chamber and extended from the housing, said plug being spaced from and unconnected with the valve means, said plug having a water passage extending upwardly from the chamber and terminating at an outlet for the same intermediate the ends thereof, a valve seat on the lower end portion of said plug, a discharge housing positioned about the plug in a water tight connection therewith and in spaced relationship with the plug at said outlet, a discharge means associated with the discharge housing and opening thereinto in communication with the plug outlet, a stem movably mounted in the plug and extended axially therethrough into said valve chamber and having an operating connection at its inner end with the movable element of the valve means, a valve member carried by the stem for cooperation with the valve seat on the lower end of the plug for closing the water passage therein, and a stem actuating means operatively connected with the outer portion of the stem.

3. A mixing valve as defined in claim 2 wherein the discharge housing is rotatable about the plug and the discharge means is a spout secured to and extending from the discharge housing.

4. A mixing valve as defined in claim 2 wherein the upper end of the plug has a coaxial socket therein and the stem also extends through the socket, packing in the socket about the stem and means for adjustably compressing the packing.

5. A mixing valve as defined in claim 2 wherein the discharge housing is rotatable and a spout is mounted on and carried by said discharge housing, and said plug being stationary in the discharge housing, means associated with the plug and removably connectable with said discharge housing for retaining the discharge housing in rotatable association about the plug.

6. A mixing valve as defined in claim 2 wherein the plug has a water channel in its circumferential surface intermediate its ends, circumferential grooves in the plug above and below the water channel and resilient sealing means seated in said grooves in sealing engagement with said discharge housing.

7. A mixing valve as defined in claim 2 wherein a portion of the discharge housing extends above the plug and has an opening in its upper end, said stem actuating means comprising a lever secured to the stem within said discharge housing and extending outwardly through the opening in the upper end of the discharge housing, fulcrum means within the housing operatively connected with the lever whereby the stem and valve means may be rotatably and longitudinally moved relative to the valve chamber and valve seat.

8. A mixing valve as defined in claim 7 wherein the lever has an inner end which comprises a head with a channel in its lower portion and the fulcrum means comprises a block partially contained in the channel and operatively connected to said head, the block being positioned for supporting engagement on the upper end surface of the plug.

References Cited in the file of this patent

UNITED STATES PATENTS

| | | |
|---|---|---|
| 925,436 | Kenley | June 15, 1909 |
| 1,122,848 | Bloom | Dec. 29, 1914 |
| 1,224,090 | Lavigne | Apr. 24, 1917 |
| 1,337,952 | Popp | Apr. 20, 1920 |
| 1,882,953 | Saelzler | Oct. 18, 1932 |
| 2,083,584 | Wineman | June 15, 1937 |
| 2,297,161 | Newton | Sept. 29, 1942 |
| 2,373,702 | Moen | Apr. 17, 1945 |
| 2,391,278 | Stark | Dec. 18, 1945 |
| 2,433,732 | Brown | Dec. 30, 1947 |
| 2,571,734 | Lindabury | Oct. 16, 1951 |
| 2,609,206 | Moen | Sept. 2, 1952 |
| 2,616,512 | Coon | Nov. 4, 1952 |

FOREIGN PATENTS

| | | |
|---|---|---|
| 38 | Great Britain | of 1870 |